July 6, 1965  N. E. PEARSON  3,192,785
BLOCK LINK FOR CHAIN
Filed May 13, 1963
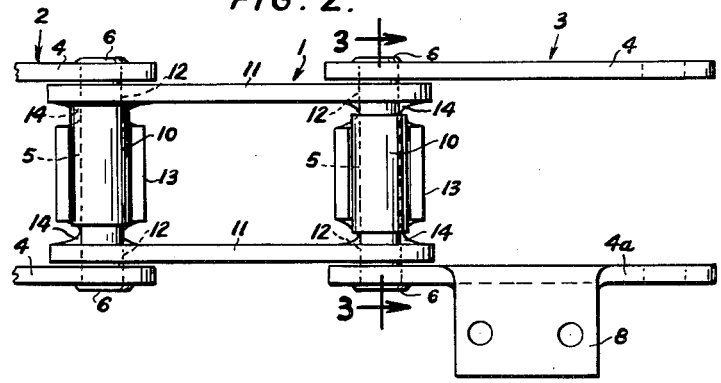
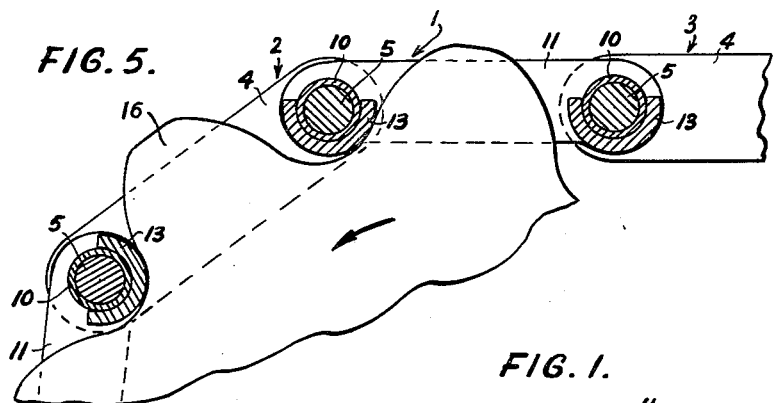
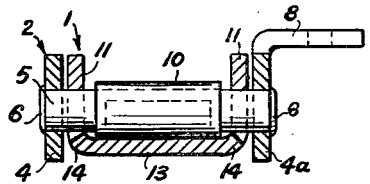
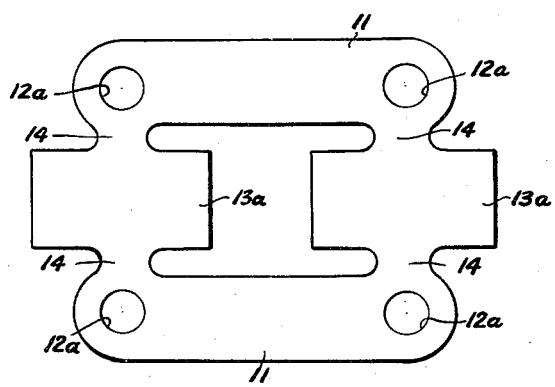

3,192,785
BLOCK LINK FOR CHAIN
Nels E. Pearson, Evergreen Park, Ill., assignor to Rex Chainbelt Inc., a corporation of Wisconsin
Filed May 13, 1963, Ser. No. 279,972
4 Claims. (Cl. 74—255)

This application is a continuation in part of my application Serial No. 151,815 filed November 13, 1961, now Patent No. 3,119,276 entitled Block Link With Integral Bushing.

This invention relates to block links for sprocket chain of stamped construction. The chain is particularly intended for conveyor use in agricultural machines. As such the chain has a "bottom side" which is the side engaging whatever support is provided the chain and also in the side which engages the drive sprocket. The other, "top side," faces away from the sprocket. According to the invention of said application, the block link includes side bars and U-shaped barrels and the top sides and ends of the outer barrels are open except for webs which join the ends of the barrels with the bottom edges of the side bars of the block link.

According to the present invention, bushings of a length less than the distance between the bars of the block link are slidable on the pins of the pin links. The bushings fit within the barrels so that in the operation of the chain over a sprocket the bushing can turn with the pin and with respect to the outer barrel or the pin can turn in and with respect to the bushing. The bushing and the barrel provide the support of the pin under the load applied thereto by the drive sprocket and the free movement of the bushing axially and rotatively provides practically complete assurance that the articulation of the chain will not be prevented by rusting of the chain or the accumulation of material at the chain joints.

The webs which connect the barrels with the side bars of the link provide the link with the rigidity and strength which is required.

In the operation of the chain in either direction, the barrels support the block on the sprocket and the teeth of the sprocket engage the barrels to drive the chain.

The pressure of the sprocket tooth against the face of the barrel is partly applied directly to the bushing and pin and partly through the webs to the side bars of the next link. Accordingly, the pin is trapped or held and supported within the barrel so that the pin is not overloaded.

The drawings furnished herewith illustrate the best mode of carrying out the invention as presently contemplated and set forth hereinafter.

In the drawings:

FIGURE 1 is a plan view of the blank from which the block link is formed;

FIG. 2 is a plan view of the top side of the block link and parts of the adjacent pin links which comprise the chain;

FIG. 3 is a section of the block link shown in FIG. 2 taken on lines 3—3 thereof;

FIG. 4 is a plan view of the bottom or sprocket side of the block link shown in FIG. 2; and FIG. 5 is a side elevation of a part of a drive sprocket and the chain in operation thereover with the links of the chain shown in section.

The block link 1 embodying the present invention is shown in the drawing between the pin link 2 and the attachment link 3 which are shown in part.

Pin link 2 comprises the plates 4 and a pin 5 extends through corresponding holes in each end of the plates. The headed ends 6 of pins 5 overlie plates 4 to secure the plates on the pins. Pins 5 are fitted tightly in the holes of plates 4 to prevent rotation of the pins in plates 4 and so that each pin link 2 comprises a rigid assembly. The attachment link 3 is similar to link 2 except that the pin plate 4a is provided, for example, with the extending flange 8 to which a conveyor flight or the like, not shown, may be attached.

The block link 1 connecting links 2 and 3 includes the bushings 10 and the plates or side bars 11 having a hole 12 at each end. Each bushing 10 is generally held in alignment with the corresponding holes 12 by the barrel 13 which is U-shaped and is disposed with the open side facing the top side of the chain. The webs 14 at the lower side of the chain join the lower end parts of each barrel with the adjacent lower edges of plates 11 to form a unitary structure.

The link 1 is blanked from flat steel stock in the form shown in FIG. 1. As shown, the plates 11 and the flat rectangular parts 13a intermediate the plates are joined by the webs 14a. The holes 12a as pierced in the blanking operation are smaller than finished holes 12.

The blank is then stamped to the form of link 1 by bending parts 13a to a U-shape and by bending webs 14a so that plates 11 lie in parallel planes with barrels 13 extending therebetween. Holes 12 are then drilled and the bushings 10 are pressed into the barrels and should be in alignment with the holes.

The thickness of the material of link 1 determines the minimum bending radius of webs 14 and generally prevents a close fit between the ends of barrels 13 and plates 11.

According to the present invention, a relatively large space is provided between the ends of barrels 13 and plates 11 adjacent to webs 14. The length of bushings 10 is similarly less than the spacing between the plates. However, bushings 10 should be longer than barrels 13 by an amount equal to the space referred to so that the entire length of the barrel is occupied by the bushing irrespective of the shifting of the bushing to the position where one end or the other of the bushing is nearly abutting a plate 11.

The shifting referred to is ordinarily prevented by the reasonably tight fit of bushings 10 in barrels 13 at least when the chain is new. During the initial service period of the chain, the pins 5 turn in bushings 10 as in conventional chain. The chain, of course, is not cleaned after each use and soon becomes filled and encrusted with organic material so that after a period of use and then of non-use, which might be only a few days, at least some of the pins become tight in the bushings. The usual chain either prevents operation of the machine, or the pins may turn instead in the plates 4 of the pin links. In the latter event, early or almost immediate failure of the pin links due to wear is an unavoidable consequence.

It has been found that whereas pins 5 of link 1 become tight in bushings 10, the bushings remain turnable in barrels 13 at least to the extent that the pins are not forced to turn in the pin links. The open side of the barrels 13 can be expanded by the bushings 10 and material adhering thereto if necessary to allow bushings 10 to rotate.

Generally, rotation of bushings 10 with pins 5 does not continue indefinitely because the motion of the chain over the sprocket and the forces applied to the chain eventually break the bonds securing the respective pins and bushings together. After a period of operation, all of the pins are again loose in the bushings and the bushings are also at this time relatively loose in barrels 13.

The large spacing of bushings 10 from plates 11 is essential to prevent material from filling the space and effecting a joinder of the bushings with plates 11. Some means of keeping the bushings centered between the plates could be employed, but has not been found necessary.

A length of bushings 10 so that they are longer, as described, then barrels 13 provides the equivalent of the centering referred to and the free movement of the bushings axially aids in keeping the barrels clear of material throughout their length and at their ends.

Chain with links 1 are operable over sprocket 16 in either direction so that in some instances chain service may be extended by interchanging the chains.

The barrel and bushing of link 1 provide for the full support of the pin. Although the barrel and the bushing are of stamped construction, conventional chain dimensions are provided to fit the sprockets ordinarily used for cast chains.

Various embodiments of the invention may be employed within the scope of the accompanying claims wherein the term "barrels" refers to the U-sections formed by webs 14 and pin supports 13.

I claim:

1. A chain for operation over a sprocket comprising block links, pin links and intermediate bushings, each block link being of integral, stamped construction and including spaced, parallel side bars having holes at each of the ends thereof and U-shaped barrels aligned between corresponding holes of the side bars, each pin link including pins extending through corresponding holes of said side bars and plates assembled on the projecting ends of the pins, each bushing being assembled on a pin and fitting within the barrel of the block link so as to be turnable with respect to the pin and the barrel, each said bushing being of a length allowing movement of the bushing on the pin between side bars.

2. A chain for operation over a sprocket comprising block links, pin links and intermediate bushings, each block link being of integral, stamped construction and including spaced, parallel side bars having holes at each of the ends thereof and U-shaped barrels aligned between corresponding holes of the side bars, each pin link including pins extending through corresponding holes of said side bars and plates assembled on the projecting ends of the pins, each bushing being assembled on a pin and fitting within the barrel of the block link so as to be turnable with respect to the pin and the barrel, each said bushing being of a length allowing movement of the bushing on the pin between side bars, each said barrel having end portions joined to the edges of the respective side bars and the remaining end portions being spaced from the side bars whereby said movement allowed the bushing is effective to keep the pins clear of material which tends to accumulate around said holes.

3. A chain for operation over a sprocket comprising block links, pin links and intermediate bushings, each block link being of integral, stamped construction and including spaced, parallel side bars having holes at each of the ends thereof and U-shaped barrels aligned between corresponding holes of the side bars, each pin link including pins extending through corresponding holes of said side bars and plates assembled on the projecting ends of the pins, each bushing being assembled on a pin and fitting within the barrel of the block link so as to be turnable with respect to the pin and the barrel and being of a length substantially less than the spacing between said bars and fitting on the pins and within the barrels so as to be movable and turnable in the barrel to provide the assured journal support of the pins selectively by rotation within the respective bushings and with the bushings in the respective barrels.

4. In a sprocket chain for agricultural use or the like and including pin links and block links interconnected by round pins turnable in the block links, each block link including a member of stamped, integral construction having parallel, spaced side bars and U-shaped barrels extending between said bars, the top side of said barrels having full length openings and said member including webs joining the ends of the barrels opposite said openings and edges of the bars on the bottom side of the link, said link further including a bushing fitting in each barrel and between said bars, said bars having holes in alignment with said bushings for receiving the pins of the adjacent link, each said bushing being movable axially on the pin between the side bars so that rusting tight on the pin and between the bars is prevented, said openings allowing the discharge of material from and precluding the accumulation of material in the barrels, said barrels further being expandable so that normal chain movement can break any locking of the bushing in the barrel that might occur as when the bushing is temporarily rusted tight on the pin.

References Cited by the Examiner

UNITED STATES PATENTS 221,795 11/79 Dickey _____ 74—248
2,773,971 12/56 Teerlink.

FOREIGN PATENTS 282,591 8/52 Switzerland.

DON A. WAITE, *Primary Examiner.*